May 16, 1961     J. P. FRANCIS     2,984,300
WINDSHIELD AWNING AND SUPPORTING MEANS THEREFOR
Filed Sept. 23, 1958
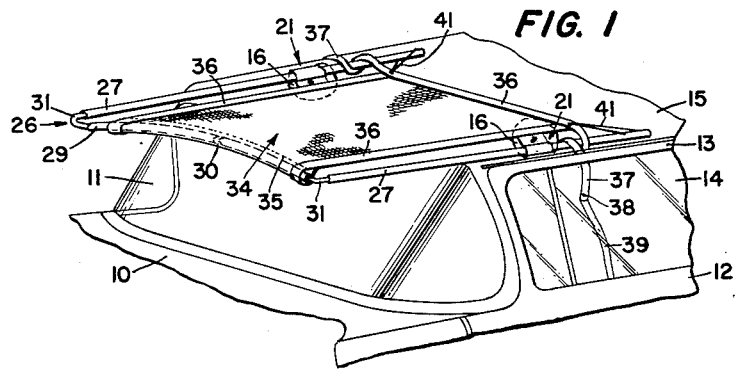
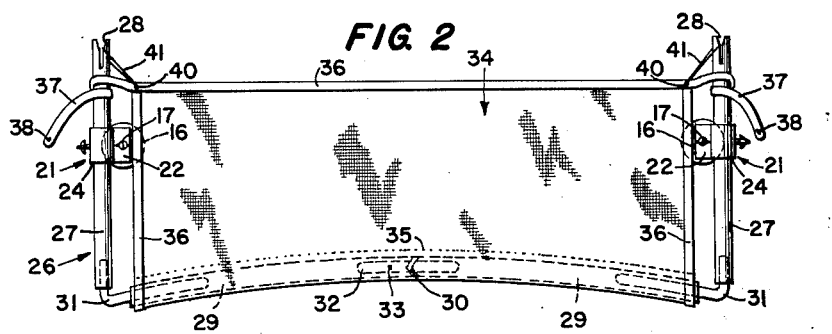
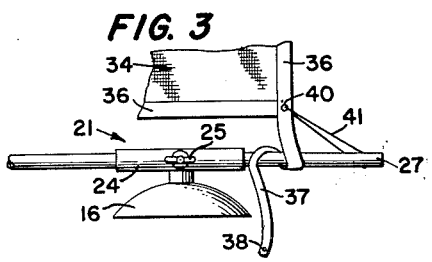
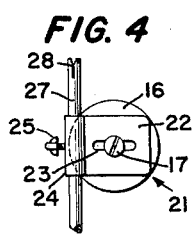
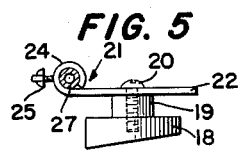
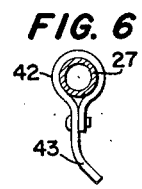
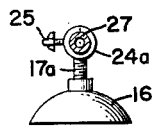
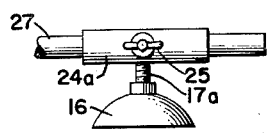
INVENTOR
John P. Francis United States Patent Office 2,984,300
Patented May 16, 1961

2,984,300

WINDSHIELD AWNING AND SUPPORTING MEANS THEREFOR

John P. Francis, 20 Boston St., Haverhill, Mass.

Filed Sept. 23, 1958, Ser. No. 762,733

2 Claims. (Cl. 160—364)

This invention relates to improvements in windshield awnings and the supporting means for supporting the said awning, an object thereof being to provide a very simple and improved awning structure adapted to engage the exterior lateral portion of the roof top of a motor vehicle in rain sealing engagement therewith.

Another object thereof is to provide a removable knockdown supporting frame for supporting an awning for full retraction when not in use over the windshield area, or easily and quickly removed from the supporting brackets, and completely disassembled in a like manner for stowage in an exceedingly small amount of space within the vehicle.

A still further object thereof is to provide awning supporting brackets mounted upon the roof engaging means adapted for any desired lateral width or any longitudinal position of engagement with the roof top in supporting a retractable awning in either spaced relation or in rain sealing engagement with the said roof top.

A still further and important object thereof is to provide protection to the windshield area from rain, sleet, snow, or the formation of ice thereon, and to provide clean and clear visibility for proper vision at all times when viewing outdoor movies at drive-in theatres and other outdoor events, thereby eliminating the continuous or the on and off use of the windshield wipers.

With these objects and still others in view, as will hereinafter more fully appear, the invention comprises certain novel constructions, combination and arrangement of parts, hereinafter described and claimed and illustrated in the accompanying drawings, in which:

Figure 1 is a perspective view, in fragment, of the front portion of a motor vehicle, the view including a perspective view of the awning shown supported in rain sealing engagement with the exterior lateral portion of the roof top.

Figure 2 is a top plan view of the awning attached to the frame structure and supported by the supporting brackets and roof engaging means.

Figure 3 is a fragmentary side elevation view of the rear corner portion of the awning shown attached to the supporting means.

Figure 4 is a top plan view of the roof engaging means, the supporting bracket and portion of the longitudinal frame member.

Figure 5 is a front elevation view of a modified form of roof engaging means, in the form of an angled metal base member.

Figure 6 is an end elevation view of a circular band, engaging the longitudinal frame member, and provided further with the suspended tab member.

Figure 7 is an end elevation view of a modified form of longitudinal support, without the flat base portion; and Figure 8 is a side elevation view of Figure 7.

Referring now more specifically to the drawings, attention is directed to Figures 1 and 2, wherein numeral 21 generally indicates the supporting brackets, attached to and supported by the roof engaging means; numeral 26 generally indicates the frame structure; and numeral 34 generally indicates the awning structure.

In Figure 1, a portion of a motor vehicle 10 is shown, with the awning structure 34 supported by frame structure 26 above the roof top 15 and over the windshield area 11 in rain sealing engagement with the said roof top.

In supporting the awning structure 34, first, roof engaging means in the form of vacuum cups 16 are attached to the roof top 15 at the desired location both laterally and longitudinally, as shown in Figure 1. Also modified roof engaging means, Figure 5, in the form of a magnetized preferably circular-shaped metal base member 18, having an angular shaped bottom for angular adjustment with said roof top, may be used in place of vacuum cups 16. The base member 18 has a flexible collar 19 made of rubber or any other suitable flexible material, with a threaded bolt 20 adapted to adjustably secure the supporting bracket 21 thereto for axial and longitudinally pivotal adjustment.

The roof engaging means, either cups 16 or base members 18, are secured to the roof top 15 with the supporting brackets 21 attached thereto by the threaded bolt 17 or 20 engaging the longitudinal aperture 23. Figures 2 and 4, formed on the flat base portion 22 of the bracket 21. The supporting bracket 21 has a tubular end portion 24 forming the longitudinal support with a wing nut 25 extending therefrom to adjustably secure the longitudinal members 27 in the desired position.

The supporting bracket is shown and described in my copending application, Serial No. 657,541, filed May 7, 1957, now Patent No. 2,913,211. My invention therefore is concerned primarily with the said supporting bracket with minor modification thereof and the improved awning structure, in providing improved means for supporting an awning in rain sealing engagement.

In Figure 2, there is shown the frame structure 26 comprising the two longitudinal members 27, and the sectional two piece lateral cross member 29 generally shaped to the lateral contour of the roof and adjustably secured together by the two angled corner members 31 freely engaging each frame member 27 and 29. A central center rod member 32 adapted to engage the inside of the lateral cross member 29 is secured to one of the said lateral cross members 29 by a pin 33 or other suitable means, whereby it is adapted to freely engage the other lateral cross member 29 for removable attachment thereto.

The free engaging angled corner members 31 allows lateral adjustment of the frame structure 26 to suit the various lateral widths of the roof tops of the different makes and sizes of motor vehicles. The lateral cross members 29 are preferably notched 30 at the abutting center to freely mate and secure axially one member 29 to the other said member thereof.

In Figures 1 and 2, the awning structure 34 comprises a flexible water repellent fabric having a lateral hem or sleeve 35 formed by stitches or other suitable means. In the use of thin gauge vinyl or other stretchable water repellent material, reinforcing bands 36 are attached to the awning at the sides and the rear thereof. The rear band 36 is adapted for securing downwardly and laterally the rear lateral portion of the awning in rain sealing engagement with the lateral portion of the roof top.

With the frame structure 26 and awning structure 34 attached thereto, the said frame structure 26 is supported by the longitudinal members 27 thereof engaging the supporting brackets 21, the said brackets 21 being attached to and above the roof engaging means 16 or 18.

In Figure 1, there is shown the awning structure 34 supported partially in spaced relation above the roof top 15 with the exception of the rear lateral portion thereof. The rear band 36 is forced downwardly and made laterally taut by the tab ends 37 of said rear band 36. The tab ends 37 are adapted to engage either the area between the doors 12 and the body portion 13, or the area between the doors 12 and the lowered windows 14 which are then raised to adjustably secure the opposing tab ends 37. A resilient lateral member 39 may be used within the vehicle to engage the apertures 38 of the tab ends 37 to provide adjustable lateral tension, thereby releasing the tab ends 37 from engaging the windows 14 or the doors 12 for use thereof by the occupants.

Referring back to Figure 2, the awning structure 34 has apertures 40 at the rear corners thereof engaging the tensioning members 41 extending from the end slots 28 of the longitudinal members 27. The awning is thus supported at the two rear corners for the rear portion, and by the lateral hem or sleeve 35 engaging the lateral cross members 29 for the forward portion.

The tab ends 37 of rear band 36, Figures 1, 2 and 3, are adapted to engage the longitudinal members 27 in a series of coils, as shown, to make the awning laterally taut and then to permit longitudinally pivotal adjustment of the frame structure 26, whereby vertical movement is obtained over the windshield area, thus altering the angular position of said frame structure 26. Pulling down the tab ends 37, after being coiled around the end portions of the longitudinal members 27, and then adjustably securing the said tab ends 37 within the vehicle permits the longitudinally angular adjustment of the said awning, as may be seen from Figures 1 and 2.

In Figure 6, the circular band 42 is an additional element which may be used to engage the extreme rear portion of each longitudinal member 27. The band 42 thus releases the use of and the forming of the coils by the tab ends 37 of the rear band 36 on the longitudinal members 27, the said tab ends 37 thereby engaging the vehicle mainly for the adjustable fastening of the said rear band 36 and attached awning in rain sealing engagement with the roof top. The circular band 42 is also provided with a tab end 43 to adjustably engage the vehicle in providing longitudinally pivotal or angular adjustment of the frame structure 26, due to the downward angle and the weight of the forward overhang of said combined frame structure 26 and awning structure 34, over the windshield area.

To retract the awning structure 34, tab ends 37, or tab ends 43 if used, are released from any vehicle engagement. The frame structure 26 is then manually retracted, from within the vehicle upon releasing the wing nuts 25 and by grasping each side longitudinal member 27 thereof and moving the said members 27 rearwardly. The awning, in this particular manner, is fully retracted in the original taut form, as in Figure 2, with or without the formed coils of tab ends 37 on longitudinal members 27.

In Figures 7 and 8, a modified form of longitudinal support 24a is shown without the flat base portion 22. The longitudinal support 24a is attached to or formed a part of the threaded stud member 17a, the said stud member engaging either the vacuum cup 16 or the base member 18 for axial and longitudinally pivotal adjustment of said support 24a therefrom.

Having thus described my invention, I desire to add that the device may be removed from the vehicle in whole or in part. Although the invention is primarily a knockdown device, the awning may be retracted and secured to the roof top in either a condensed coiled form or in the original taut form as shown in Figure 2.

While certain embodiments of my invention have been disclosed in the foregoing description, it will be understood that various modifications may occur to those skilled in the art. Changes, therefore, in the construction and arrangement may be made without departing from the spirit and scope of the invention as disclosed in the appended claims.

I claim:

1. An adjustable rain awning structure adjustably supported over the roof top and the windshield area of an automobile, comprising frame supporting means having a longitudinal tubular member and a centrally disposed threaded vertical member, a vacuum cup connected to said threaded vertical member and adjustably supporting said frame supporting means above and adjacent to the outer lateral edges of the roof top, a longitudinally retractable and laterally adjustable frame structure having opposing retractable side spaced longitudinal members and an outer lateral member adjustably attached thereto by separable angular shaped corner engaging members engaging the said side longitudinal members and the said outer lateral member, said retractable longitudinal side members of the said frame structure engaging the said longitudinal tubular members of said frame supporting means for adjustable support therefrom, a retractable taut supported awning panel substantially narrower in lateral width than the opposing side spaced longitudinal members of the said frame structure, said awning engaging only the forward lateral end of said frame structure, and an awning supporting member extending outwardly from each rear corner of said awning to adjustably engage the rear portions of said laterally adjustable side spaced apart longitudinal frame members for lateral and longitudinal support thereto in providing a taut supported awning panel for longitudinally adjustable movement of said awning panel in spaced apart relationship over the roof top of said automobile.

2. An awning structure as claimed in claim 1, and further including a pair of additional awning supporting members, each additional supporting member being attached to each rear corner of said awning, said additional supporting members extending outwardly and at an angle dissimilar to the said first mentioned awning supporting members, said additional supporting members providing additional support for the taut supported awning panel in supporting the said supported awning in spaced apart relationship or in rain sealing engagement with the lateral portion of the roof top upon engaging either or both the side longitudinal frame members or the body portion of said automobile for adjustable attachment thereto.

References Cited in the file of this patent

UNITED STATES PATENTS

| | | |
|---|---|---|
| Re. 14,360 | Henry | Sept. 18, 1917 |
| 1,679,802 | Allerheiligen | Aug. 7, 1928 |
| 2,065,242 | Omerly | Dec. 22, 1936 |
| 2,121,264 | Rubotton | June 21, 1938 |
| 2,204,432 | Morgadanes | June 11, 1940 |
| 2,711,923 | Parks | June 28, 1955 |
| 2,743,957 | Sherman | May 1, 1956 |
| 2,812,208 | Francis | Nov. 5, 1957 |